Figure 1:
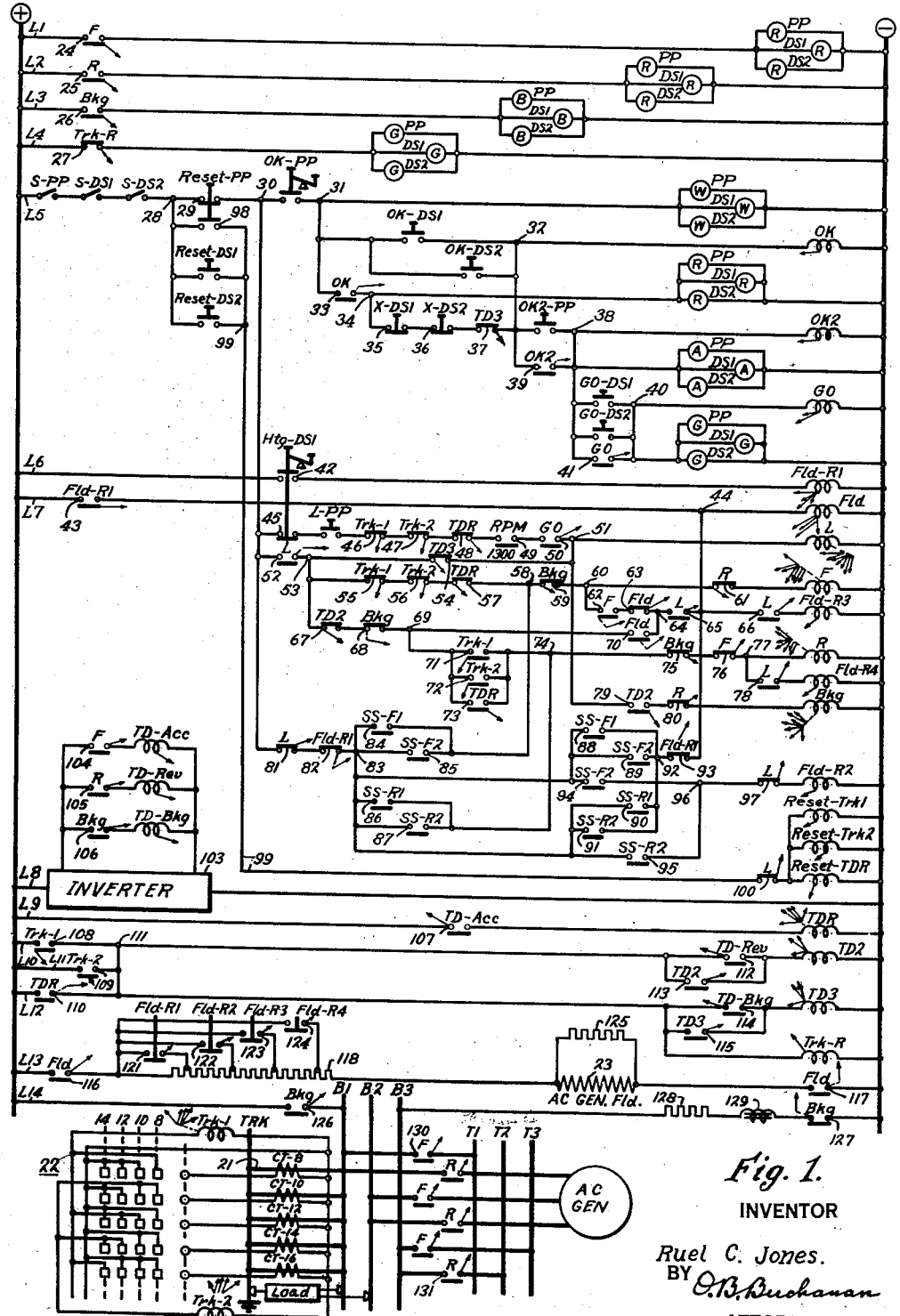

May 20, 1952  R. C. JONES  2,597,104
SAFETY CONTROL SYSTEM FOR MOTORS
Filed April 16, 1947  2 SHEETS—SHEET 1

INVENTOR
Ruel C. Jones.
BY *C. B. Buchanan*
ATTORNEY

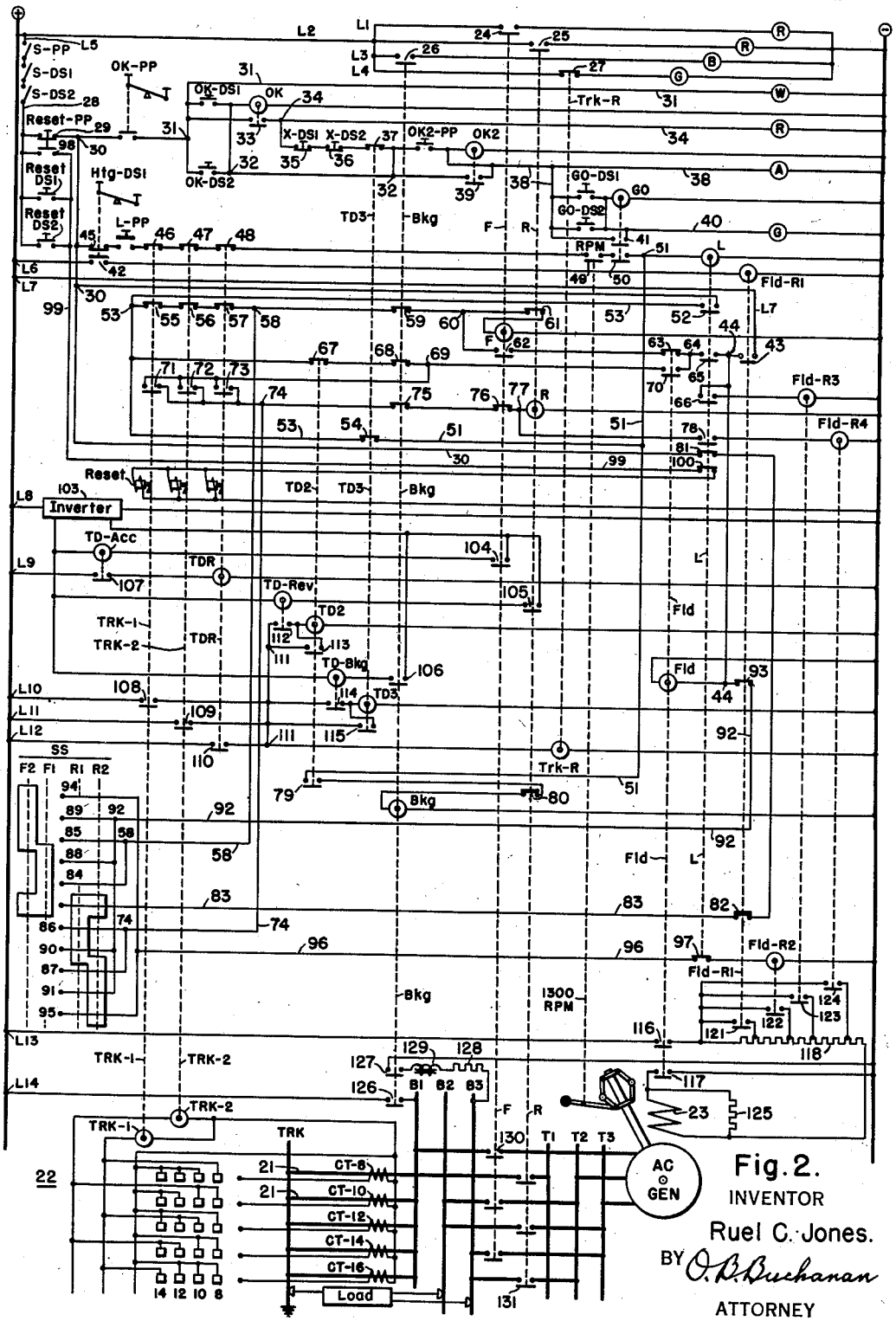

Patented May 20, 1952

2,597,104

UNITED STATES PATENT OFFICE 2,597,104

SAFETY CONTROL SYSTEM FOR MOTORS

Ruel C. Jones, Pittsburgh, Pa., assignor to Westinghouse Electric Corporation, East Pittsburgh, Pa., a corporation of Pennsylvania Application April 16, 1947, Serial No. 741,914

15 Claims. (Cl. 104—149)

My invention relates to a safety interlocking signalling-system, and certain features of an associated automatic-relay controlled-system, for a self-propelled polyphase-motored movable body. While the invention is of more generic utility, it was primarily designed and developed for a linear-motor electric catapult, for launching aircraft in a manner which is generally described and claimed in a patent of Frank B. Powers, 2,404,984, granted July 30, 1946, and assigned to the Westinghouse Electric Corporation.

The use of an electric catapult for launching airplanes involves the safety of many people, as well as the safety of a large amount of very costly equipment. Furthermore, it involves very high speeds of a rather heavy shuttle-car, for towing the airplane during the assisted-acceleration-run, involving the necessity for split-second timing, in the control of the shuttle-car. In such installations, it is necessary, or extremely desirable, to have a special power-plant for supplying the necessary electrical energy, and this power-plant must be located underground, close to the launching-track, or in some other location which, in general, is not in sight of the launching-field, and which is usually in charge of power-plant operators who are too preoccupied with their own switchboards and other apparatus and machinery in their charge, to pay any attention to extraneous objects, even though such objects could be seen from where they stand. These circumstances present the problem of communication between the field-operator or operators, at the starting-point or at some other control-point or control-tower on the field, and the operator at the power-station or plant.

As every precaution must be taken, to prevent catapult-operation except when all factors are coordinated and ready, an important object of my present invention is to provide a plurality of interlocked signal-circuits which must be operated, by a plurality of operators, in a predetermined sequence of operations, before a launching-circuit can be energized, with provision whereby any one of several operators, at different locations, can cancel or nullify the signals, at any point in the sequence, up to the time when the actual launching-circuit is completed, with provision for causing it to be necessary, in the event of any signal-cancellation, to go through with all or a predetermined part of the prescribed sequence of signal-operations, in the proper predetermined order, before the launching-circuit will be readied for use.

Further objects of my invention relate to the use of a launching-relay, or other operation, maintaining relay, having a holding-circuit which is opened at the termination of a predetermined sequence of launching operations, including both the polyphase energization and a direct-current energization of the polyphase-motored shuttle-car, with field-switch-means having a holding-circuit which is opened at the termination of the polyphase energization of the shuttle-car, and before the application of direct-current braking-power to the polyphase windings of the shuttle-car motor.

A further object of my invention relates to the use of a reset coil or coils, for resetting certain portions of the automatic shuttle-car controlling-mechanism, with suitable interlocks between the resetting circuits or mechanism and the safety-relay contacts which are utilized to place the launching-circuit in readiness for a launching-operation.

With the foregoing and other objects in view, my invention consists in the circuits, systems, combinations, parts and operations hereinafter described and claimed, and illustrated in the accompanying drawing, wherein Fig. 1 is a simplified schematic view of circuits and apparatus illustrating the essential principles of my invention in a preferred form of embodiment, and Fig. 2 is a circuit-diagram showing the apparatus of Fig. 1, better showing the interrelations of the circuits and relays, with the relay-contacts shown on the respective relay-stems, which are lifted by their relay-coils, the groups of three signal-lights, of Fig. 1, being reduced to one light each, to save space in Fig. 2.

In the accompanying drawing, the polyphase-motored shuttle-car is diagrammatically represented by means of a track TRK and two third-rail buses B2 and B3, which operate as feeders or motor-terminals for supplying power to a three-phase motor (not specifically shown) on a shuttle-car (not specifically shown), the motor and shuttle-car being substantially as shown in the aforementioned Powers patent. A third feeder-bus B1 is utilized, which is connected, as shown, to the track TRK, by means of a plurality of feeder-connections 21, located at a plurality of spaced points along the trackway, these feeder-connections 21 being equipped with current-transformers CT—8, CT—10, etc., which are utilized to energize either one of two track-relays Trk—1 and Trk—2, under the control of a position-selector drum 22, as more particularly described and claimed in my copending application, Serial No. 537,515, filed May 26, 1944, patented May 16, 1950, No. 2,508,169 and assigned to the Westinghouse Electric Corporation.

Only the first four positions of the distance-selector drum 22 are shown, this drum being utilized for the purpose of preselecting a particular one of the current-transformers CT to be connected to the operating-coil of one of the track-relays Trk—1 or Trk—2, and for also, as a safety-measure or backup-protection, connecting the next succeeding current-transformer CT to the actuating-coil of the other track-relay, so that it can operate in case of failure of the first one. In each position of the drum 22, all of the remaining current-transformers CT are short-circuited. These current-transformers CT become energized only when the shuttle-car is in a track-position close to the location of the feeder-connection 21 in which the particular current-transformer is located, so that the current-transformers are responsive to the position of the car on the track, during the accelerating-run when the plane is being launched.

In the drawing, the power-plant is diagrammatically represented, in its barest essentials, by means of a three-phase generator AC—GEN, and a constant-voltage direct-current energy-source or sources which are schematically represented by positive and negative bus-terminals (+) and (—). The polyphase generator AC—GEN is provided with polyphase output-terminals T1, T2 and T3, and it is also provided with a field-winding 23.

The control of the various apparatus is under the control of a plurality of control-stands or desks or switchboards, which are disposed at different locations. One control-stand is located at the power-plant, represented by the suffixes PP in the various signal and control designations, while two or more control-stands are located on deck, or on or above the launching-field, as represented, on the schematic diagram, by the suffixes DS1 and DS2. All three control-stands are provided with certain signal-lights and certain control-buttons or switches, which are utilized in the proper coordination and control of the equipment.

The simplified schematic diagram, Fig. 1 of the accompanying drawing, shows fourteen across-the-line circuits, numbered L1 to L14, respectively, for the various signal and control apparatus, all of which is shown, for the purpose of simplification, as being connected across the same direct-current bus-terminals (+) and (—).

In Fig. 1, the various relays, or electrically operated switches or contactors, are suitably indicated by letters or legends, and these letters or legends are applied both to the operating-coils and to all of the contacts of any particular relay or switch, as a convention symbolically tying together the various parts of any given relay or switch. The switches are all shown in their non-actuated positions. Arrows or dotted lines are also used, to symbolically indicate how the various parts of each relay are connected together.

The first line L1 of the diagram shows the energization of three red indicator-lights, one on each of the three control-stands PP, DS1 and DS2, under the control of a make-contact 24 of the main forward-contactor F which supplies forward-phase-sequence power from the generator AC—GEN to the track-system, as will be subsequently described. These lights inform each of the control-stand operators whenever polyphase accelerating-power is being supplied to the track-system and thence to the shuttle-car which is intended to be diagrammatically represented by the track-system in the drawing.

The second line L2 of the diagram shows the energization of three more red indicator-lights, at the three different control-stands, under the control of a make-contact 25 of a reverse-contactor R which feeds polyphase power, in the reverse phase-sequence, to the track-system, for the plug-reversal of the shuttle-car, to arrest its speed or even to reverse its direction of movement. These second red lights inform each of the control-stand operators that reverse-power is being supplied to the track-system.

The third line L3 of the diagram shows how three blue indicator-lights, at the three control-stands, are controlled by a make-contact 26 of a braking relay Bkg, which serves to apply direct-current power across a plurality of phases of the track-system, for the purpose of bringing the shuttle-car to a dead standstill. These blue lights inform each of the operators that direct-current braking-power is being supplied to the track-system.

The fourth line L4 of the diagram shows how three green indicator-lights are energized, at the three control-stands, under the control of a back-contact 27 of an auxiliary track-relay Trk—R, which is energized in response to the track-relays Trk—1, Trk—2, in a manner which will be subsequently described. These green lights inform the operators that the back-relays and other position-retaining equipment of the automatic apparatus are properly reset, to their initial or non-actuated positions, in readiness for another launching-operation.

The fifth line L5 of the diagram shows three serially connected safety-switches S—PP, S—DS1 and S—DS2, one for each of the control-stands, for energizing a circuit 28, which continues on, through a back-contact 29 of a double-pole reset-pushbutton Reset—PP, at the power-plant, to energize a conductor 30. The safety switches S must be closed, by all of the operators, before the signal-circuit conductor 30 is energized.

The conductor 30 is utilized to control a predetermined sequence of signal-operations, and also to control the actual automatic launching-operation, once the launching is initiated. The bare outlines of the various control-circuits will first be explained, and then the operation of the entire equipment will be separately explained.

From the circuit 30, a signal-control circuit continues through a double-position "first ready" pushbutton OK—PP, which the power-plant operator depresses, and which thereafter stays in its depressed position until the power-plant operator deliberately restores it to its open position. This "first-ready" pushbutton OK—PP energizes a circuit 31, which has three branch-circuits. The first branch-circuit of 31 energizes three white signal-lamps, one at each of the control-stands, to show that the power-plant stands in readiness for further orders.

The second branch-circuit of the conductor 31 includes two parallel-connected pushbuttons OK—DS1 and OK—DS2, which are utilized to energize a conductor 32, and thence the operating-coil of a relay OK, which shows that a "ready-to-launch" signal has been given by either one of the desk-stand operators.

The third branch-circuit of the conductor 31 is under the control of a make-contact 33 of the OK-relay, which energizes a conductor 34 which lights three red signal-lamps, at the three control-stands, for showing that the "ready-to-launch" signal has been given.

The conductor 34 has a branch-circuit which serves as a holding-circuit for the OK-relay, this holding-circuit containing three serially connected, normally closed, contacts 35, 36 and 37 of two signal-cancelling pushbuttons X—DS1 and DS2, and a No. 3 time-delay relay TD3 which will be subsequently described. These three serially connected back, or normally closed, contacts 35, 36 and 37 are utilized to energize a holding-circuit for the conductor 32 which maintains the energization of the actuating-coil of the relay OK, after the release of the ready-to-launch push-button OK—DS1 or OK—DS2. The cancellation-buttons X—DS1 and X—DS2 are located at the respective above-deck or field-located control-stands DS1 and DS2, and enable the operators at these stands to cancel the OK-signal.

The conductor 32 also has a branch-circuit, under the control of a "second ready" pushbutton OK2—PP, which enables the electrical operator, in the power-plant, to signal that he has rechecked his equipment and stands momentarily ready to receive the launching-signal. This "second-ready" pushbutton OK2—PP energizes a conductor 38 which has three branch-circuits. The first branch-circuit of 38 energizes the actuating-coil of a relay OK2, which closes its make-contact 39, bypassing the pushbutton OK2—PP. The second branch-circuit of the conductor 38 lights three amber signal-lamps, at the three control-stands, for showing that the "second-ready" signal has been given.

The third branch-circuit of the conductor 38 continues on, through two parallel-connected "launching-signal" pushbuttons GO—DS1 and GO—DS2, for energizing a conductor 40 having two branch-circuits, the first of which energizes the actuating-coil of a "launching-signal" relay GO. This relay GO picks up its make-contact 41 which bypasses the launching-signal pushbutton GO—DS1 and GO—DS2. The second branch-circuit of the conductor 40 lights three green launching-signal lamps, at the three control-stands.

When the foregoing sequence of signalling-operations have been completed, the equipment is ready for a launching-operation.

The next line, L6, of the diagram is not directly concerned with the launching-operation. It is under the control of a "make," or normally open, contact 42 of a double-pole, double-position, track-heating pushbutton Htg—DS1 which energizes the No. 1 field-resistance relay Fld—R1.

The seventh line L7 of the schematic diagram shows that the No. 1 field-resistance relay Fld—R1 has a make-contact 43 which energizes a conductor 44, which in turn energizes the operating-coil of a field-switch or relay Fld.

The track-heating pushbutton Htg—DS1 has a back-contact 45 which is in a branch-circuit of the conductor 30. This branch-circuit has a number of serially connected contacts, including a launching-pushbutton L—PP which is located on the power-plant control-stand, three serially connected back-contacts 46, 47 and 48 of the two track-relays Trk—1 and Trk—2, and an auxiliary time-delay relay TDR, respectively, a serially connected make-contact 49 of a speed-responsive relay RPM, and a serially connected make-contact 50 of the launching-signal relay GO. The speed-responsive relay R. P. M. is not otherwise shown in the drawing; it is intended as a symbolic representation of a speed-indicator on the generator AC—GEN, which picks up and closes its contact when the generator is running at its maximum desired speed of 1300 R.P.M., or other desired speed. This speed-indicator is needed because the generator has a considerable fly-wheel-effect or inertia, so that it is capable of giving up a considerable portion of its stored kinetic energy during the launching-operation, and it is necessary to be sure that the generator has a sufficient amount of stored kinetic energy, before permitting the launching-operation to commence. These seven serially-connected contacts 45, L—PP, 46, 47, 48, 49 and 50, are utilized to energize a launching-initiating circuit from the conductor 30 to a conductor 51, which energizes the actuating-coil of a launching-relay L.

The actuation of the launching-relay L immediately closes its make-contact 52, which completes a circuit from the conductor 30 to a conductor 53, which has three branch-circuits.

One branch circuit of the conductor 53 contains a back-contact 54 of a No. 3 time-delay relay TD3, which energizes the launching-circuit conductor 51, and thus serves as a holding-circuit for the launching-relay L.

The second branch-circuit of the conductor 53 includes three serially connected back-contacts 55, 56 and 57 of the track-relays Trk—1 and Trk—2 and the auxiliary time-delay relay TDR. These three serially connected contacts 55, 56 and 57 are utilized to energize a circuit 58, which continues on, through a back-contact 59 of the braking-relay Bkg, to a conductor 60, which, in turn, continues on, through a back-contact 61 of the reverse-contactor R, to the actuating-coil of the forward-contactor F.

The energization of the forward-contactor F closes its make-contact 62, which is connected in series with a back-contact 63 of the field-switch Fld. The two serially connected contacts 62 and 63 energize a circuit 60—62—63—64, which continues on, through a make-contact 65 of the launching-relay L, to the field-relay conductor 44 which energizes the field-contactor Fld. The field-relay conductor 44 is also connected, through a launching-relay make-contact 66, to the No. 3 field-resistance relay Fld—R3.

The third branch-circuit of the conductor 53 contains two serially connected back-contacts 67 and 68 of a No. 2 time-delay relay TD2 and the braking-contactor Bkg, respectively. These two serially connected contacts 67 and 68 connect the conductor 53 to a conductor 69, having two branch-circuits. One branch-circuit of 69 contains a make-contact 70 of the field-contactor Fld, which energizes the circuit 64—65—44, and thus provides a holding-circuit for the field-contactor Fld. Preferably, the field-contactor make-contact 70 closes before the field-contactor break-contact 63 opens.

The second branch-circuit of the conductor 69 contains three parallel-connected make-contacts 71, 72 and 73 of the two-track-switches Trk—1 and Trk—2 and the auxiliary time-delay relay TDR, respectively, and these three contacts are utilized to energize a circuit 74, which continues on, through the serially connected back-contacts 75 and 76 of the braking relay Bkg and the forward-contactor F, respectively, to energize a circuit 77 which is connected to the operating-winding of the reverse-contactor R. The conductor 77 is also connected, through a launching-relay make-contact 78, to the actuating-winding of a No. 4 field-resistance relay Fld—R4.

The conductor 51 has a branch-circuit, which continues on through a make-contact 79 of the No. 2 time-delay relay TD2, and serially a connected back-contact 80 of the reverse-contactor R, to energize the actuating-winding of the braking-contactor Bkg.

The foregoing connections complete the main energizing-connections for an automatic, relay-controlled launching-operation, including an initial polyphase-power accelerating-run, a reverse-power plug-reversal operation, and a direct-current braking-operation.

The schematic diagram also shows that the conductor 30 has a branch-circuit which contains two serially connected back-contacts 81 and 82 of the launching-relay L and the No. 1 field-resistance relay Fld—R1, respectively. These two back-contacts 81 and 82 are utilized to energize a circuit 83 which is utilized for serving a spotting-switch SS, which performs the slow-return functions of the main controller-switch of the Powers patent, or the spotting-switch functions of my previously mentioned copending application. In accordance with my present invention, this spotting-switch SS cannot be utilized except when the launching-relay L is in its deenergized condition.

The spotting-switch SS has two forward-positions, designated by the suffixes F1 and F2, and two reverse-positions, designated by the suffixes R1 and R2, there being several switch-contacts in each of these four positions.

From the conductor 83, there are four branch-circuits. A first branch-circuit includes two parallel-connected make-contacts 84 and 85 of the two forward positions SS—F1, SS—F2 of the spotting-switch, and these two contacts 84 and 85 are utilized to energize the circuit 58 which energizes the forward-contactor F. A second branch-circuit of the conductor 83 includes two parallel-connected make-contacts 86 and 87, which are closed in the two reverse-positions SS—R1 and SS—R2 of the spotting-switch SS, and these two contacts 86 and 87 are utilized to energize the conductor 74 which energizes the reverse-contactor R. A third branch-circuit of the conductor 83 includes four parallel-connected make-contacts 88, 89, 90 and 91, which are closed in all four positions SS—F1, SS—F2, SS—R1, and SS—R2 of the spotting-switch SS, and these four contacts are utilized to energize a conductor 92, which continues on, through a back-contact 93 of the No. 1 field-resistance relay Fld—R1, to energize the conductor 44 which actuates the field-switch Fld. A fourth branch-circuit of the conductor 83 includes two parallel-connected make-contacts 94 and 95, which are energized in the No. 2 forward and reverse positions SS—F2 and SS—R2 of the spotting-switch SS, and these two contacts 94 and 95 are utilized to energize a circuit 96, which continues on, through a back-contact 97 of the launching-relay L, to energize the actuating-coil of the No. 2 field-resistance relay Fld—R2.

The schematic diagram shows that the conductor 28 has a branch-circuit containing the normally open, or "make," contact 98, of the double-pole reset-pushbutton Reset—PP at the power-plant control-stand. This contact 98 is utilized to energize a circuit 99 which extends on, through a back-contact 100 of the launching-relay L, to energize the three reset-coils of the two track-relays Trk—1 and Trk—2, and the auxiliary time-delay relay TDR. The three reset-coils are designated by the legends, Reset—Trk 1, Reset—Trk 2 and Reset—TDR. These three relays Trk—1, Trk—2 and TDR are position-retaining relays, which remain in their actuated positions, once they are momentarily actuated, until they are reset by a momentary energization of their respective reset-coils. The make-contact 98 of the power-plant resetting-button Reset—PP is bypassed by two parallel-connected deck-stand reset-buttons Reset—DS1 and Reset—DS2, so that any one of the three control-stand operators may reset the automatic launching-equipment, after the completion of a launching-operation.

The line L8 of the schematic diagram shows the energization of an inverter 103, which supplies alternating-current voltage, of any suitable frequency, to three alternating-current timers, which are utilized to time the accelerating-run, the reverse-power operation, and the direct-current braking, as indicated by the timer-designations TD—Acc, TD—Rev and TD—Bkg. These three timers are actuated, or set in motion, by make-contacts 104, 105 and 106 of the respective relays which initiate the operations being timed, namely the forward-contactor F, the reverse-contactor R, and the braking-contactor Bkg, respectively.

The line L9 of the diagram shows that the acceleration-timer TD—Acc has a make-contact 107 which energizes the auxiliary time-delay relay TDR, this relay being a position-retaining relay, as previously explained.

The lines L10, L11 and L12 of the schematic diagram show the use of three parallel-connected make-contacts 108, 109 and 110 of the two track-relays Trk—1 and Trk—2 and the auxiliary time-delay relay TDR, to energize a circuit 111, having three branch-circuits. One branch-circuit of 111 contains the parallel-connected make-contacts 112 and 113 of the reverse-power timer TD—Rev and the No. 2 time-delay relay TD2, to energize the actuating-coil of the No. 2 time-delay relay TD2. A second branch-circuit of the conductor 111 contains two parallel-connected make-contacts 114 and 115 of the braking timer TD—Bkg and the No. 3 time-delay relay TD3, to energize the actuating-coil of the No. 3 time-delay relay TD3. The third branch-circuit of the conductor 111 energizes the actuating-coil of the auxiliary track-relay Trk—R.

The circuit L13 of the schematic diagram shows the use of two make-contacts 116 and 117 of the field-contactor Fld for energizing the field-winding 23 of the alternating-current generator AC—GEN, across the direct-current terminals (+) and (−), through a field-resistance 118, various portions of which are short-circuited by the make-contacts 121, 122, 123 and 124 of the four field-resistance relays Fld—R1 to Fld—R4. The generator field-winding 23 is preferably bypassed by a field-discharging resistor 125.

The line L14 of the schematic diagram shows how the make-contacts 126 and 127 of the braking-contactor Bkg connect two of the track-system buses B1 and B3, respectively, to the positive and negative terminals (+) and (−), respectively, through a current-limiting resistor 128 and a choke-coil 129 which serves to limit the rate of rise of the direct-current in the braking-circuit, when the braking-contactor Bkg is closed, thus protecting the direct-current bus (+) and (—) from having too sudden a load thrust upon it.

The switching equipment of my automatic control-system is completed by the main contacts 130 and 131 of the polyphase contactors F and R, which apply the polyphase power of the generator-terminals T1, T2 and T3 to the motor-circuit buses B1, B2 and B3, in either the forward or reverse phase-sequence, respectively.

The operation of my invention will best be understood by going through the steps leading up to, during, and following, an actual launching.

Before getting ready for a launching, it may be necessary to clear the track of snow or ice, or it may be necessary to dry off the insulators (not shown) which support the feeder and third-rail buses B1, B2, B3. If such an operation is necessary, short-circuiting jumpers (not shown) may be manually placed across the track TRK and the two third-rail buses B2 and B3 at one end of the track, and other jumpers (not shown) may be manually connected in shunt around the main contacts 130 or 131 of either the "forward" or "reverse" main polyphase contactor F or R, so as to relieve these contacts from damage due to overcurrent. Then the No. 1 deck-stand operator can depress his track-heating pushbutton H*tg*—DS1 in line L6 of the diagram, and leave it closed as long as the heating-operation is to continue. This energizes the generator-field with the No. 1 field-resistance relay F*ld*—R1 closed, giving a low excitation on the polyphase generator, and applying a low voltage on the track-system. When this operation is completed, the heating-button H*tg*—DS1 will be returned to its normal illustrated position, and all jumpers will be removed.

Before an actual launching can be undertaken, all three control-stand operators must be in their places, and must indicate that fact by closing their respective safety-switches S—PP, S—DS1, and S—DS2 in line L5 of the diagram. Before the power-plant operator closes his safety-switch S—PP, he should see that his power-plant is properly functioning. Before the deck-stand operator, at the starting-position, closes his safety-switch S—DS1, he should see that the shuttle-car is harnessed to the plane (not shown) and properly tautened in position. And before the down-field deck-stand operator closes his safety-switch S—DS2, he should see that the field is clear of any "unaware" encumbrances.

The power-plant operator, before any launching, must get certain data on the plane to be launched, including the weight of the plane, the required launching-speed, and the average effective self-propelling thrust of the plane during the take-off run, (after making allowance for wind-conditions). The power-plant operator should then set the "distance-selector" drum 22, and the three timers TD—A*cc*, TD—R*ev*, and TD—B*kg*, in accordance with his calibration-charts. The distance-selector drum should be set for a distance or acceleration-run which will give a trifle over the required launching-speed. The acceleration-timer TD—A*cc* should be adjusted for a time which would give a slightly higher speed. The reverse-power timer TD—R*ev* should be adjusted for a time which will nearly exactly bring the shuttle-car to standstill, with a slightly shortened time-setting if the acceleration-run terminates far from the remote track-end, and a slightly lengthened time-setting if there is less room for stopping the car after the take-off. In this way, the car will be left coasting slowly toward the end of the track where there is ample room for bringing it to a complete stop. The braking-timer TD—B*kg* should be adjusted for a time which will allow the braking-power to bring the car to a full stop, plus a reasonable factor of safety. The direct-current braking-power should be interrupted as promptly as is safe, so as to avoid an unnecessary power-drain on the direct-current buses (+) and (—), and to avoid unnecessary heating of the shuttle-car motor-windings.

After the power-plant operator has made all presetting-adjustments, (including a momentary depression of the reset-button Reset—PP, if one of the auxiliary-stand operators has not already attended to the track-relay resetting), the power-plant operator should close the "first-ready" pushbutton OK—PP, and leave it closed (so long as he continues to be ready).

After all safety-switches and the "first-ready" button have been closed, the white indicator-lights signal this fact on all three control-stands PP, DS1, and DS2.

The plane is then power-tested by the pilot; and when it has been given clearance by the proper officer, one of the auxiliary-stand operators momentarily depresses the "standby" pushbutton OK—DS1 or OK—DS2, lighting the red indicator-lights.

The electrical operator, in the power-plant, then rechecks the power-plant conditions, and stands ready for the launching-signal, transmitting this information to the field-operators by momentarily depressing the "second-ready" pushbutton OK2—PP, which lights the amber indicator-lights.

The officer in charge then gives the firing signal, the pilot "revs" his engine to full speed, or otherwise turns on his full starting-power, and one of the auxiliary-stand operators momentarily depresses the "launching-signal" pushbutton GO—DS1 or GO—DS2. If all other signal-operations have been performed, as described, in the proper order, the green indicator-lamps will now be lit, and the safety-relay GO will be energized, closing the safety-relay contact 50 in the launching-relay energizing-circuit 30–51.

The power-plant operator then momentarily depresses the "launching" pushbutton L—PP, in the launching-relay energizing-circuit 30–51, and the automatic launching-operations are instantly initiated.

It is an important feature of my invention that the launching-operation cannot be initiated, at the main control-stand, in the power-plant, until the signal-relay GO has been energized, in response to a predetermined series of signal-operations, performed by a plurality of operators in a predetermined order. The precise details are not particularly important, as to precisely what signals will be utilized, and by whom made. It is important, however, that there shall be a plurality of operators, located at different places, by which I mean that they are so located that each one can attend to only his own province. It is also important that these operators shall be required to perform successive checking-steps, and signal that circumstance to one another, performing a predetermined sequence of checks, in a predetermined order, before an automatic launching-operation is permitted. These requirements are necessary, because of the number of lives which may be in jeopardy if all is not right with the equipment, and also because of the great costliness of the equipment which is involved. My safety-interlocks cannot make sure that all of the required observations and checks have been made, but it can make sure that signals indicating the execution of the prescribed checks shall have been given, by the proper operators, in the prescribed order.

It is a further important feature of my invention, that these signals may be cancelled, by any one of the operators, at any moment before the actual launching is initiated. After that moment, a signal-cancellation will be too late, because the launching-relay L seals itself in, and holds itself actuated until its holding-circuit 53—54—51 is finally interrupted at 54 by the actuation of the No. 3 time-relay relay TD3. The main control-stand operator, in the power-plant, can cancel the signals by opening his safety-switch S—PP, or by momentarily depressing his reset-button Reset—PP, or by moving his first-ready pushbutton OK—PP to the open position, whichever is readier at hand. The auxiliary-stand operators can cancel their signals by momentarily depressing their cancellation-buttons X—DS1 or X—DS2. When either one of these cancellation-buttons is depressed, all signals are cancelled, except the initial "first-ready" signal of the power-plant operator, and the prescribed sequence of signalling-operations must be gone through with, again, before the safety-relay GO can be energized.

The automatic launching-operations, under the initiation and control of the launching-relay L, have been more or less indicated during the description of the wiring-connections of the schematic drawing. In brief, they may be summarized as follows.

The launching-relay L closes its make-contact 52, energizing the circuit 53—55—56—57—58—59—60—61, and energizing the "forward" main polyphase contactor F, which connects the generator-terminals T1, T2 and T3 to the motor-load terminals B1, B2 and B3 in the desired forward phase-sequence. The forward-contactor F closes its contact 62, which energizes the field-contactor circuit 60—62—63—64—65—44, which connects the generator-field 23 across the direct-current supply line. At the same time, the circuit 44—46 energizes the No. 3 field-resistor relay Fld—R3, which properly adjusts the amount of field-resistance 118 in the field-winding circuit of the generator. The time-constant of the generator causes its field to build up slowly, so that the generator-voltage is built up slowly (yet not too slowly), avoiding undue shock.

The shuttle-car, which is diagrammatically represented by the track TRK and the third-rail buses B2 and B3, is now accelerating rapidly, pulling the plane (not shown) which is being launched.

At the predetermined point in the accelerating-run, one of the track-switches Trk—1 or Trk—2 picks up, and interrupts the forward-contactor circuit at 55 or 56. The field-contactor Fld is not deenergized, however, because it has sealed itself in, through the holding-circuit 53—67—68—69—70—64—65—44. As soon as the forward-phase-sequence power is removed from the motor-bus equipment, the forward-contactor F closes its back-contactor 76, which energizes the reverse-contactor R through the circuit 69—(71 or 72)—74—75—76—77. At the same time, the No. 4 field-resistance relay Fld—R4 is energized at 77—78. This applies plug-reversal power to the polyphase motor of the shuttle-car, and as soon as the shuttle-car begins to slow down, the plane throws off its connection to the shuttle-car and takes off.

Meanwhile, the shuttle-car is being very rapidly decelerated, under reverse-power plugging. When the shuttle-car has been brought to a rather low speed, or sometimes when it is even reversed in speed, as previously explained, the reverse-power timer TD—Rev picks up and energizes the No 2 time-delay relay TD2 at 112. This No. 2 time-delay relay opens its back-contact 67 and deenergizes the field-contactor Fld, and it also closes its make-contact 79 and energizes the braking-contactor Bkg, through the circuit 51—79—80. The braking-contactor applies direct-current braking-power to two or more motor-terminals B1 and B3, until this operation is finally terminated by the braking-timer TD—Bkg, which energizes the No. 3 time-delay relay TD3 at 114. The No. 3 time-delay relay TD3 opens its back-contact 54, in the holding-circuit of the launching-relay L, and it also opens its back-contact 37, in the cancellation portion of the signal-holding circuits, thereby performing the same function as if a cancellation-button, X—DS1 or X—DS2, had been depressed. This cancellation-operation includes the opening of the GO-relay contact 50, in the initial actuating-circuit of the launching-relay L.

The back-contacts 54 and 37 of the No. 3 time-delay relay TD3 remain open until one of the control-stand operators depresses one of the reset-pushbuttons Reset—PP, Reset—DS1, or Reset—DS2, thereby resetting the track-relays, deenergizing the No. 3 time-delay relay TD3, and deenergizing the auxiliary track-relay Trk—R. The last-named relay thereupon closes its back-contact 27, and lights the green "relays-reset" lights.

The explanation just given is a bare outline of the essential operational sequence as performed by the illustrated embodiment of my invention. It is subject to minor variations in many details. This outline-explanation has omitted various safety-interlocks (which have been shown, and previously described) for preventing one relay or contactor from being closed until another is opened, or the like. It has omitted various sneak-circuit interlocks (which have been shown, and previously described) for preventing the energization of one relay-control-circuit from also energizing various branch-circuits which are to be tied in only during the energization of the launching-relay L or some other relay. It has also omitted the previously described energization of the three alternating-current timers TD—Acc, TD—Rev, and TD—Bkg, and the previously described control of the four lights, on each control-stand, which indicate, at all times, the power which is connected to the car, and the condition of the track-relays, as shown by lines L1 to L4 of the schematic diagram.

It is a feature of my invention that the launching relay L has a holding-circuit such as 30—52—53—54—51, which is not interrupted until the completion of the complete sequence of launching-operations, including a period of direct-current braking, while the field-contactor Fld is energized, by its holding-circuit, such as 53—67—68—69—70—64—65—44, only so long as polyphase power is being supplied to the car.

It is a feature of my invention that the same relay which finally deenergizes the holding-circuit of the launching-relay L also cancels the safety-signal circuits at 37.

It is also a feature of my invention that there is a resetting-coil-means, for resetting some of the automatic launching-control equipment after the completion of the automatic operations, and that this resetting-coil-means is also utilized to reclose, or reset, the interrupting relay-contacts 54 and 67 in the holding-circuits of the launching-relay and the field-contactor, respectively, as well as various relay-contacts in the safety-signal system, including the automatic cancellation-contact 37 and the "reset-indication" contact 27.

After the automatic launching-operation has completed its appointed operations, the shuttle-car is left standing somewhere on the track, and the field-operator may bring it back to the starting-point by means of the spotting-switch SS, as previously described. The reset-button Reset—PP, Reset—DS1, or Reset—DS2 may be operated either before or after the spotting-switch operation.

Various features of the general scheme for automatic launching-control, including the control of the field-contactor Fld and the braking-contactor Bkg, aside from any particular relay-circuit means, are more particularly described and claimed in an application of Maurice F. Jones, Serial No. 737,647, filed March 27, 1947, now Patent No. 2,508,168 granted May 16, 1950, and various features of the power-plant apparatus are more particularly described and claimed in Patent No. 2,484,260 of E. C. Whitney, granted October 11, 1949, both assigned to the Westinghouse Electric Corporation.

While I have shown only a single form of embodiment of my invention, I wish it to be understood that this showing is merely illustrative of the general principles, and that the appended claims are to be given the broadest construction consistent with their language.

I claim as my invention:

1. In combination, a polyphase generator having a field-winding circuit, a polyphase load-circuit, a direct-current supply-circuit, polyphase switching-means for connecting and disconnecting said polyphase load-circuit to and from said polyphase generator in either the forward or reverse phase-sequence, braking switching-means for connecting and disconnecting a plurality of conductors of said polyphase load-circuit to and from said direct-current supply-circuit, field switching-means for performing a controlling operation on said field-circuit, operation-presetting means for presetting the termination of the forward-phase-sequence energization of the polyphase load-circuit, an operation-maintaining relay-means, starting-means for initially actuating said operation-maintaining relay-means, an operation-relay holding-circuit, responsive to the actuation of said operation-maintaining relay-means, for maintaining the actuation of said operation-maintaining relay-means, forward-controlling means, responsive to the actuation of said operation-maintaining relay-means, for closing said polyphase switching-means in a desired forward phase-sequence and for also closing said field switching-means, forward-terminating means, responsive to the operation-presetting means, for opening said polyphase switching-means in the forward phase-sequence, the apparatus including polyphase-power termination-means for opening said polyphase switching means and said field switching-means, braking-controlling means, responsive to said polyphase-power termination-means and responsive also to a continued actuated condition of said operation-maintaining relay-means, for closing said braking switching-means, and operation-terminating means for opening said braking switching-means and for also opening said operation-relay holding-circuit.

2. In combination, a polyphase generator having a field-winding circuit, a polyphase load-circuit, a direct-current supply-circuit, polyphase switching-means for connecting and disconnecting said polyphase load-circuit to and from said polyphase generator in either the forward or reverse phase-sequence, braking switching-means for connecting and disconnecting a plurality of conductors of said polyphase load-circuit to and from said direct-current supply-circuit, field switching-means for performing a controlling operation on said field-circuit, operation-presetting means for presetting the termination of the forward-phase-sequence energization of the polyphase load-circuit, an operation-maintaining relay-means, starting-means for initially actuating said operation-maintaining relay-means, an operation-relay holding-circuit, responsive to the actuation of said operation-maintaining relay-means, for maintaining the actuation of said operation-maintaining relay-means, forward-controlling means, responsive to the actuation of said operation-maintaining relay-means, for closing said polyphase switching-means in a desired forward phase-sequence and for also closing said field switching-means, forward-terminating means, responsive to the operation-presetting means, for opening said polyphase switching-means in the forward phase-sequence and for promptly thereafter closing said polyphase switching-means in the reverse phase-sequence, reverse-power terminating-means for opening said polyphase switching-means and said field switching-means, braking-controlling means, responsive to said reverse-power terminating-means and responsive also to a continued actuated condition of said operation-maintaining relay-means, for closing said braking switching-means, and operation-terminating means for opening said braking switching-means and for also opening said operation-relay holding-circuit.

3. In combination, a polyphase energy-circuit, a polyphase load-circuit, a direct-current supply-circuit, polyphase switching-means for connecting and disconnecting said polyphase load-circuit to and from said polyphase energy-circuit in a desired forward phase-sequence, other switching-means for performing one or more other controlling operations affecting said polyphase load-circuit, said other switching-means including braking switching-means for connecting and disconnecting a plurality of conductors of said polyphase load-circuit to and from said direct-current supply-circuit, operation-presetting means for presetting the termination of the forward-phase-sequence energization of the polyphase load-circuit, an operation-maintaining relay-means, starting-means for initially actuating said operation-maintaining relay-means, an operation-relay holding-circuit responsive to the actuation of said operation-maintaining relay-means, for maintaining the actuation of said operation-maintaining relay-means, forward-controlling means, responsive to the actuation of said operation-maintaining relay-means, for closing said forward-phase-sequence switching-means, forward-terminating means, responsive to the operation-presetting means, for opening said forward-phase-sequence switching-means, additional control-means, responsive to the opening of the forward-phase-sequence switching-means and responsive also to a continued actuated condition of said operation-maintaining relay-means, for setting in motion some one or more operations of said other switching-means, including said braking switching-means, and means, including a relay-contact in said operation-relay holding-circuit, for interrupting said operation-relay holding-circuit and opening said braking switching-means.

4. In combination, a polyphase generator having a field-winding circuit, a polyphase load-circuit, a direct-current supply-circuit, polyphase switching-means for connecting and disconnecting said polyphase load-circuit to and from said polyphase generator in either the forward or reverse phase-sequence, braking switching-means for connecting and disconnecting a plurality of conductors of said polyphase load-circuit to and from said direct-current supply-circuit, field switching-means for performing a controlling operation on said field-circuit, operation-presetting means for presetting the termination of the forward-phase-sequence energization of the polyphase load-circuit, an operation-maintaining relay-means, starting-means for initially actuating said operation-maintaining relay-means, an operation-relay holding-circuit, responsive to the actuation of said operation-maintaining relay-means, for maintaining the actuation of said operation-maintaining relay-means, forward-controlling means, responsive to the actuation of said operation-maintaining relay-means, for closing said polyphase switching-means in a desired forward phase-sequence, field-controlling means, responsive to an actuated condition of said forward-controlling means and responsive also to an open condition of said field switching-means, for closing said field switching-means, a field-controlling holding-circuit, responsive to the closing of said field switching-means and responsive also to a continued actuated condition of said operation-maintaining relay-means, for maintaining the closed condition of said field switching-means, forward-terminating means, responsive to the operation-presetting means, for opening said forward-controlling means, reverse-controlling means, responsive to the operation-presetting means and responsive also to an open condition of the polyphase switching-means in the forward phase-sequence, for closing said polyphase switching-means in the reverse phase-sequence, reverse-power presetting-means for presetting the reverse-power operation, reverse-terminating means, responsive to the reverse-power presetting-means, for opening the polyphase switching-means and the field-controlling holding-circuit, braking-controlling means, responsive to the last-mentioned opening of the polyphase switching-means, for closing said braking switching-means, and means, including a relay-contact in said operation-relay holding-circuit, for interrupting said operation-relay holding-circuit and opening said braking switching-means.

5. An electrically powered track-system, comprising the combination, with the track, of a polyphase current-collector circuit in juxtaposition to said track, a polyphase energy-circuit, a direct-current supply-circuit, polyphase switching-means for connecting and disconnecting said polyphase current-collector circuit to and from said polyphase energy-circuit in a desired forward phase-sequence, other switching-means for performing one or more other controlling operations affecting said polyphase current-collector circuit, said other switching-means including braking switching-means for connecting and disconnecting a plurality of conductors of said polyphase current-collector circuit to and from said direct-current supply-circuit, track-relay means which is selectively responsive at any one of a plurality of selectable points along the track, operation-presetting means for utilizing said track-relay means for terminating the forward-phase-sequence energization of the polyphase current-collector circuit, an operation-maintaining relay-means, starting-means for initially actuating said operation-maintaining relay-means, an operation-relay holding-circuit, responsive to the actuation of said operation-maintaining relay-means, for maintaining the actuation of said operation-maintaining relay-means, forward-controlling means, responsive to the actuation of said operation-maintaining relay-means, for closing said forward-phase-sequence switching-means, forward-terminating means, responsive to the operation-presetting means, for opening said forward-phase-sequence switching-means, and additional control-means, responsive to the opening of the forward-phase-sequence switching-means and responsive also to a continued actuated condition of said operation-maintaining relay-means, for setting in motion some one or more operations of said other switching-means, including said braking switching-means, said additional control-means including a timer-means, responsive to the initiation of the braking operation and responsive also to a continued responded condition of said track-relay means, for interrupting said operation-relay holding-circuit, said timer-means including a self-energized holding-circuit which is responsive to a continued responded condition of said track-relay means.

6. An electrically powered track-system, comprising the combination, with the track, of a polyphase current-collector circuit in juxtaposition to said track, a polyphase energy-circuit, a direct-current supply-circuit, polyphase switching-means for connecting and disconnecting said polyphase current-collector circuit to and from said polyphase energy-circuit in either the forward or reverse phase-sequence, braking switching-means for connecting and disconnecting a plurality of conductors of said polyphase current-collector circuit to and from said direct-current supply-circuit, track-relay means which is selectively responsive at any one of a plurality of selectable points along the track, operation-presetting means for utilizing said track-relay means for terminating the forward-phase-sequence energization of the polyphase current-collector circuit, an operation-maintaining relay-means, starting-means for initially actuating said operation-maintaining relay-means, an operation-relay holding-circuit, responsive to the actuation of said operation-maintaining relay-means, for maintaining the actuation of said operation-maintaining relay-means, forward-controlling means, responsive to the actuation of said operation-maintaining relay-means, for closing said polyphase switching-means in a desired forward phase-sequence, forward-terminating means, responsive to the operation-presetting means, for opening said forward-controlling means, reverse-controlling means, responsive to the operation-presetting means and responsive also to an open condition of the polyphase switching-means in the forward phase-sequence, for closing said polyphase switching-means in the reverse phase-sequence, reverse-power presetting-means for presetting the reverse-power operation, reverse-terminating means, responsive to the reverse-power presetting-means, for opening the polyphase switching-means, braking-controlling means, responsive to the last-mentioned opening of the polyphase switching-means, for closing said braking switching-means, and operation-terminating means, having a relay-contact in said operation-relay holding-circuit, for interrupting said operation-relay holding-circuit and opening said braking switching-means, said operation-terminating means including a self-energized holding-circuit which is responsive to a continued responded condition of said track-relay means.

7. An electrically powered track-system, comprising the combination, with the track, of a polyphase current-collector circuit in juxtaposition to said track, a polyphase generator having a field-winding circuit, field switching-means for performing a controlling operation on said field-circuit, a direct-current supply-circuit, polyphase switching-means for connecting and disconnecting said polyphase current-collector circuit to and from said polyphase generator in either the forward or reverse phase-sequence, braking switching-means for connecting and disconnecting a plurality of conductors of said polyphase current-collector circuit to and from said direct-current supply-circuit, track-relay means which is selectively responsive at any one of a plurality of selectable points along the track, operation-presetting means for utilizing said track-relay means for terminating the forward-phase-sequence energization of the polyphase current-collector circuit, an operation-maintaining relay-means, starting-means for initially actuating said operation-maintaining relay-means, an operation-relay holding-circuit, responsive to the actuation of said operation-maintaining relay-means, for maintaining the actuation of said operation-maintaining relay-means, forward-controlling means, responsive to the actuation of said operation-maintaining relay-means, for closing said polyphase switch-means in a desired forward phase-sequence, field-controlling means, responsive to an actuated condition of said forward-controlling means and responsive also to an open condition of said field switching-means, for closing said field switching-means, a field-controlling holding-circuit, responsive to the closing of said field switching-means and responsive also to a continued actuated condition of said operation-maintaining relay-means, for maintaining the closed condition of said field switching-means, forward-terminating means, responsive to the operation-presetting means, for opening said forward-controlling means, reverse-controlling means, responsive to the operation-presetting means and responsive also to an open condition of the polyphase switching-means in the forward phase-sequence, for closing said polyphase switching-means in the reverse phase-sequence, reverse-power presetting-means for presetting the reverse-power operation, reverse-terminating means, responsive to the reverse-power presetting-means, for opening the reverse-controlling means and the field-controlling holding-circuit, said reverse-terminating means including a self-energized holding-circuit which is responsive to a continued responded condition of said track-relay means, braking-controlling means, responsive to said reverse-terminating means, for closing said braking switching means, and operation-terminating means, having a relay-contact in said operation-relay holding-circuit, for interrupting said operation-relay holding-circuit and opening said braking switching-means, said operation-terminating means including a self-energized holding-circuit which is responsive to a continued responded condition of said track-relay means.

8. The invention as defined in claim 5, characterized by the track-relay means being of the retained-contact type having a reset-coil, and the combination including reset-means for at times energizing said reset-coil.

9. The invention as defined in claim 6, characterized by the track-relay means being of the retained-contact type having a reset-coil, and the combination including reset-means for at times energizing said reset-coil.

10. The invention as defined in claim 7, characterized by the track-relay means being of the retained-contact type having a reset-coil, and the combination including reset-means for at times energizing said reset-coil.

11. In combination, a load-circuit, power-supply means therefor, automatic control-means operative, once it is set in operation, to carry through a predetermined series of a plurality of successive switching-operations affecting the power-supply to said load-circuit, an operation-starting circuit for said automatic control-means, a starting-contact and a safety-contact serially included in said operation-starting circuit, a plurality of circuit-controlling means, disposed at a plurality of different locations, each of said circuit-controlling means being capable of performing a circuit-controlling operation and also a signal-operation which is desirable for reasons of safety, and safety-means including circuit-means and a contact-operating coil operable, when energized, to close said safety-contact only after the completion of a predetermined sequence of a plurality of said safety-insuring signal operations, in a predetermined order, by a plurality of operators at different locations.

12. The invention as defined in claim 11, in combination with a plurality of signal-canceling means, under the control of a plurality of operators at different locations, whereby said safety-means may be deenergized at any time before the energization of the operation-starting circuit, and for thereafter causing a plurality of said safety-insuring signal operations to be executed in a predetermined order before said safety-means can close said safety-contact.

13. The invention as defined in claim 11, in combination with a plurality of indicating-signals for simultaneously indicating, to a plurality of operators, at different locations, the completion of successive steps in the predetermined series of said safety-insuring signal operations, each indicating-signal, after the first step, being operable only upon the completion of the preceding steps in the proper order.

14. In combination, a load-circuit, power-supply means therefor, automatic control-means operative, once it is set in operation, to carry through a predetermined series of a plurality of successive switching-operations affecting the power-supply to said load-circuit, a plurality of presetting adjustment-means for said automatic control-means, a resetting means for resetting said automatic control-means after the completion of its operation, an operation-starting circuit for said automatic control-means, a self-energized holding-circuit for said automatic control - means, operation - termination contact-means for interrupting said operation-starting circuit and said holding-circuit after the conclusion of the operation, and means responsive to a subsequent operation of the resetting means for reclosing said operation-terminating contact-means.

15. In combination, a load-circuit, power-supply means therefor, automatic control-means operative, once it is set in operation, to carry through a predetermined series of a plurality of successive switching-operations affecting the power-supply to said load-circuit, a plurality of presetting adjustment-means for said automatic control-means, a resetting means for resetting said automatic control-means after the completion of its operation, an operation-starting circuit for said automatic control-means, a starting-contact and a safety-contact in said operation-starting circuit, a plurality of circuit-controlling means, disposed at a plurality of different locations, each of said circuit-controlling means being capable of performing a circuit-controlling operation and also a signal-operation which is desirable for reasons of safety, safety-means including circuit-means and a contact-operating coil operable, when energized, to close said safety-contact only after the completion of a predetermined sequence of a plurality of said safety-insuring signal operations, in a predetermined order, by a plurality of operators at different locations, operation-termination means including means for deenergizing said safety-means and for thereafter requiring a plurality of said safety-insuring signal operations to be executed in a predetermined order before said safety-means can close said safety-contact, and means responsive to a subsequent operation of the resetting means for resetting said operation-terminating means.

RUEL C. JONES.

No references cited.